United States Patent [19]
Schöffel

[11] 3,994,071
[45] Nov. 30, 1976

[54] MEASURING INSTRUMENT

[75] Inventor: Franz Schöffel, Augsburg, Germany

[73] Assignee: Paul Von Sigriz, Sachsenkam, Germany

[22] Filed: Mar. 18, 1975

[21] Appl. No.: 559,527

[30] Foreign Application Priority Data
Mar. 18, 1974 Germany............................ 2412993

[52] U.S. Cl. ................................ 33/169 R; 33/165; 33/170; 33/172 R
[51] Int. Cl.² ........................................... G01C 5/02
[58] Field of Search ................. 33/165, 169 R, 170, 33/172 R, 164 R

[56] References Cited
UNITED STATES PATENTS

| | | | |
|---|---|---|---|
| 456,875 | 7/1891 | Bellows | 33/165 |
| 729,970 | 6/1903 | Spalding | 33/164 R |
| 2,144,972 | 1/1939 | Hirst | 33/165 |
| 2,650,436 | 9/1953 | Gessler | 33/165 |
| 2,882,606 | 4/1959 | Hitchcock | 33/172 R |
| 2,926,426 | 3/1960 | Lury | 33/169 R |
| 3,197,876 | 8/1965 | Smith | 33/172 R |

FOREIGN PATENTS OR APPLICATIONS

| | | | |
|---|---|---|---|
| 80,872 | 4/1895 | Germany | 33/165 |

Primary Examiner—Richard E. Aegerter
Assistant Examiner—Richard R. Stearns
Attorney, Agent, or Firm—Hans Berman

[57] ABSTRACT

An instrument permitting linear dimensions to be measured to four or more significant decimal digits includes a stack of identical gage blocks movable in a receptacle in the direction of stack elongation and a strong spring longitudinally compressing the stack. A carrier pin on the housing of a micrometer may be inserted between longitudinally consecutive blocks of the stack to establish the first digit. Camming cooperation of the carrier pin with the gage blocks draws engagement faces on the micrometer housing against guide faces of the receptacle. The contact member of the micrometer is mounted on the micrometer slide which may be shifted longitudinally of the stack by engaged threads on the slide and on a drum rotatable on the housing about a longitudinal axis. The second digit is read from cooperating indicia on the housing and slide, and the third and fourth digits from indicia on the drum and on the housing.

15 Claims, 17 Drawing Figures

MEASURING INSTRUMENT

This invention relates to the precision measurement of linear dimensions, and particularly to an instrument for measuring linear dimensions to at least four significant decimal digits.

A conventional dial indicator gage normally furnishes a direct reading of two significant digits, and a third digit may be derived from the number of full revolutions of the needle on the indicator dial and the like. When relatively great dimensions are to be measured precisely, it is necessary to mount the gage for movement on a support and to derive a fourth digit from the position of the gage proper on the support. It is difficult precisely to position a gage on the support in a reproducible manner.

It was proposed in German Patent No. 928,201 to use a precisely machined tube as a support for a sliding gage and to install in the tube a stack of fixed steel balls or steel rollers of selected, precisely identical diameter. Each pair of consecutive elements in the stack precisely defines a recess tapering toward the axis of the tube and engaged by a detent on the gage. The known device functions well when new, but is subject to relatively rapid wear, and thereby loses its initial precision.

It is an object of the invention to provide an instrument permitting linear dimensions to be measured to at least four significant decimal digits and which is capable of an extended useful life.

With this object and others in view, as will presently become apparent, the instrument of the invention includes a support which defines an elongated receptacle. Gage blocks are guided in the receptacle for longitudinal movement toward and away from a position in which the blocks abuttingly engage each other in the direction of receptacle elongation jointly to constitute a stack of gage blocks. A carrier pin has one portion shaped to be received between each pair of longitudinally consecutive gage blocks in the stack and may be secured in the receptacle by a clamping device which clamps the gage members longitudinally against the received portion of the carrier pin while another portion of the carrier pin projects from the receptacle and provides a mounting for a gage which includes a contact member movable in the direction of receptacle elongation and means for indicating the position of the contact member relative to the carrier pin.

Other features, additional objects, and many of the attendant advantages of this invention will readily be appreciated as the same becomes better understood by reference to the following detailed description of a preferred embodiment when considered in connection with the appended drawing in which.

Figures 1, 1A:
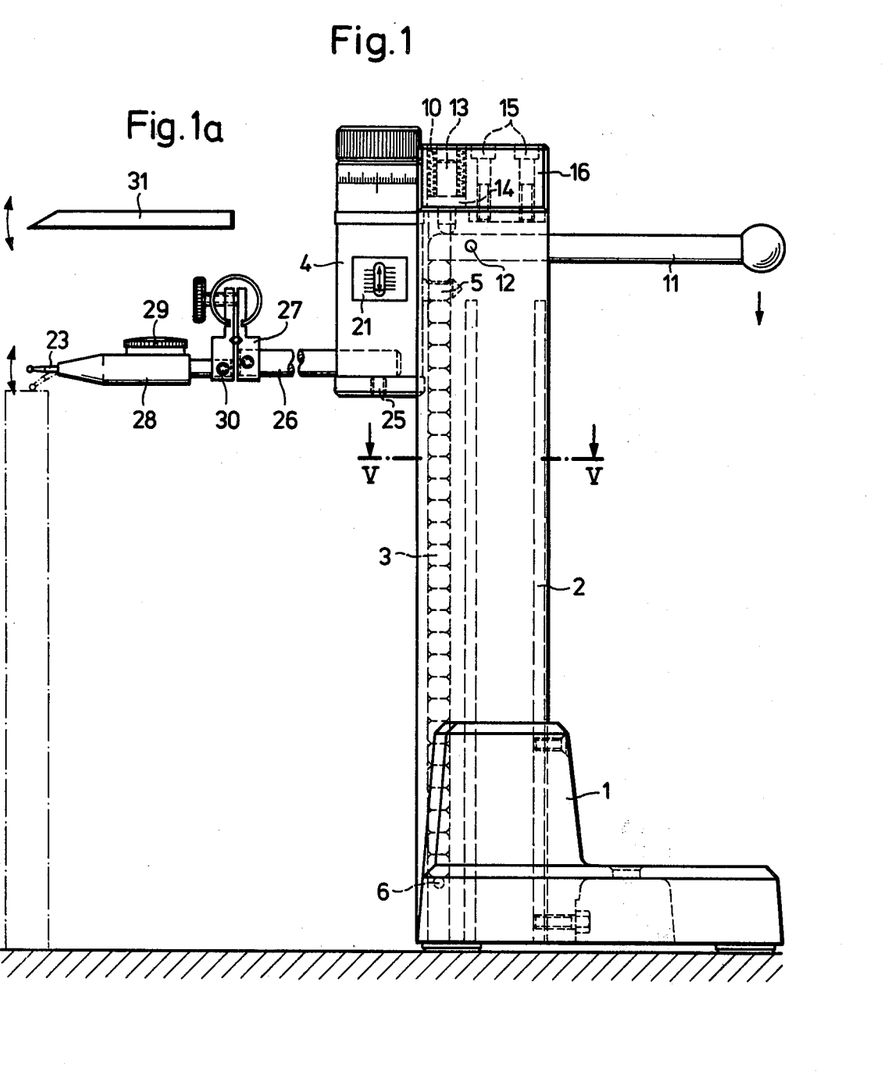
FIG. 1 shows a measuring instrument of the invention in side elevation.
FIG. 1a illustrates a contact member alternatively insertable in the instrument of FIG. 1 in a corresponding view.

Referring now to the drawing in detail, and initially to FIG. 1, there is seen a measuring instrument whose supporting structure essentially consists of a cast iron base 1 and a housing 2 which is vertically elongated in the illustrated, normal operating position of the instrument. The housing provides a receptacle for a stack of gage blocks 3. A micrometer 4 is secured to the housing 2 in precisely determined spatial relationship by a fixed carrier pin 5 which is partly received between two longitudinally consecutive gage blocks 3. The stack of gage blocks 3 rests on an abutment pin 6 in the housing 2.

Figure 5:
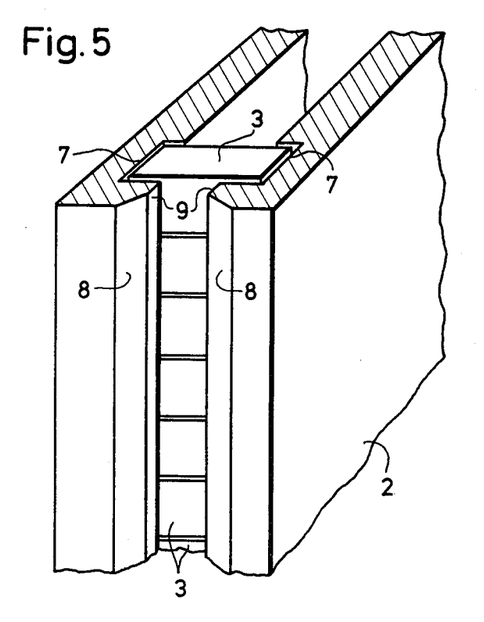
FIG. 5 illustrates supporting structure for the micrometer in the apparatus of FIG. 1 in a fragmentary perspective view taken partly in section on the line V — V.

As is better seen in the simplified view of FIG. 5, the stack of blocks 3 is guided in vertical grooves 7 of the housing walls with sufficient clearance to permit free movement of the blocks, such clearance having been somewhat exaggerated in FIG. 5 for the sake of pictorial clarity. Two parallel faces 9 of the housing wall flank a vertical slot in the housing 2 adjacent the blocks, and guide faces 8 flare outward from the faces 9.

Reverting to FIG. 1, there is seen a stack of cup springs or Belleville washers 10 enveloping an axial end portion of a plunger 13 and resting on a flange 14 of the plunger. A lever 11 is fastened to the housing 2 by a pivot pin 12. A short arm of the lever 11 is pressed against the topmost block 3 by the plunger 13, the cup springs 10 being backed by a cap 16 attached to the top of the housing 2 by bolts 15. A long arm of the lever 11 extends out of the housing 2. When its free end is depressed, as indicated by an arrow, the blocks 3 are released from the pressure of the springs 10.

Figure 2:
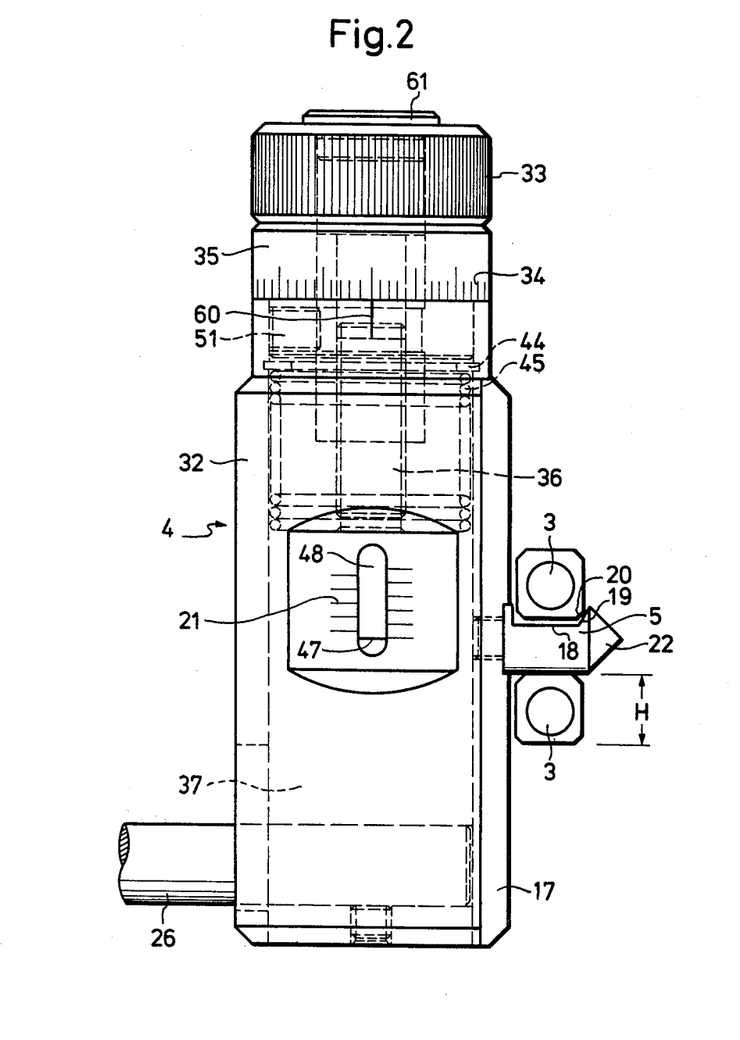
FIG. 2 shows a micrometer in the apparatus of FIG. 1 on a larger scale.

As shown in FIG. 2, the principal elements of the micrometer 4 are a tubular housing 32, a drum assembly 33, 35, 36, and a slide 37. The housing 32 has two guide faces 17 which are parallel to the vertical direction of elongation of the receptacle in the housing 2 and converge away from the housing 32 at the same angle at which the guide faces 8 on the housing 2 diverge toward the micrometer, and the guide faces 8, 17 are abuttingly engaged in the condition of the apparatus shown in FIG. 1.

The gage blocks 3 are as identical as they can conveniently be made. In the side view of FIG. 2, they are seen to have the cross sectional shape of a square with edges 20 beveled at an angle of 45° and to have a cylindrical through bore. As is evident from FIG. 5, they are about twice as long as they are wide and high. As not specifically shown, they carry engraved numbers, and their individual dimensions, particularly the height H, are checked from time to time and recorded for reference together with the combined height of all blocks 3 below each individual block to establish the normal level of each block 3 above a reference plane, such as the bottom of the base 1.

The free end 22 of the carrier pin 5 is conical and has an apex angle of 90°. When the pin is being inserted between two selected blocks 3, its free end 22 makes line contact with the beveled edges 20 of the blocks and shifts them apart, an operation which requires release of the cup springs 10 by means of the lever 11. The main portion of the pin 5 has a flat, recessed, horizontal top face 18 separated from the bottom face of the superposed block 3 by an air gap in the assembled condition of the instrument only partly illustrated in FIG. 2. An oblique cam face 19 of the pin 5 engages a horizontal rear edge of the superposed block 3. When the lever 11 is released, the pin 5 is pulled inward of the housing 2 by the clamping force of the springs 10 transmitted to the pin 5 by the camming cooperation of the cam face 19 with a block 3, until the guide faces 8, 17 are firmly engaged, whereby the spatial relationship of the micrometer 4 to the housing 2 and to the stack of blocks 3 is precisely established. In an actual embodiment of the invention, the height H of each block 3 is 10 mm and known to the nearest 0.01 mm. The second digit of the dimension to be measured is read from a scale 21 on the micrometer housing 32 whose lines are vertically spaced 1 mm.

Reverting again to FIG. 1, a set screw 25 accessible through the open bottom of the micrometer housing 32 holds a cylindrical rod 26 in precisely horizontal position as will presently be described. A coupling 27, known in itself, and an allen screw 30 pivotally connect the rod 26 to gage 28 whose dial 29 indicates the angular position of a contact member 23 of the gage 28. The gage 28 may be replaced by a scriber 31 shown in FIG. 1a after loosening the screw 30.

Figure 3:
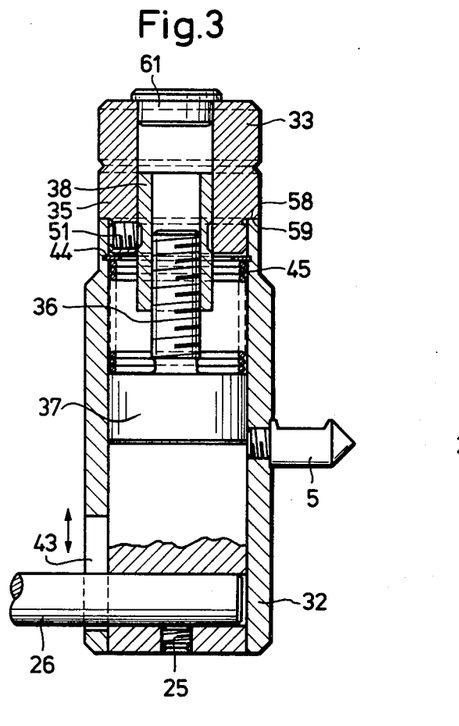
FIG. 3 illustrates the micrometer of FIG. 2 in side-elevational section.

The drum assembly includes a kurnled knob 33 mounted on the micrometer housing 32 for rotation about the vertical axis of the approximately cylindrical housing 32, as is shown in FIG. 2. The knob 33 is integral with a generally cylindrical drum portion 35 carrying axial scale markings 34 which cooperate with an axial index mark 60 on the housing 32. The scale 34 may be read to the nearest 0.01 mm. As is better seen in FIG. 3, a radial bottom face 58 on a shoulder of the drum portion 35 rests on an annular, radial face 59 of the micrometer housing 32 about the top orifice of the bore in the housing 32.

The knob 33 and the drum 35 are tubular, and their bore 55 (FIG. 4c) is closed in an upward direction by a plastic plug 61 with a press fit. A portion of the drum 35 received in the housing 32 has a diametrical bore 49 (FIG. 4c) internally threaded to receive a set screw 51. The screw abuttingly secures a tubular connector 38 to the drum portion 35 in fixed axial and angular relationship so that the knob 33, drum portion 35, and connector 38 jointly move as a drum assembly.

Figure 4A:
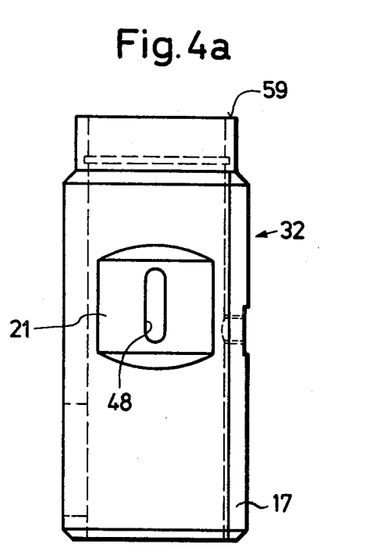
FIGS. 4a, 4b, 4c, and 4d show individual elements of the micrometer of FIG. 2 inside elevation and partly in section.
Figure 4B:
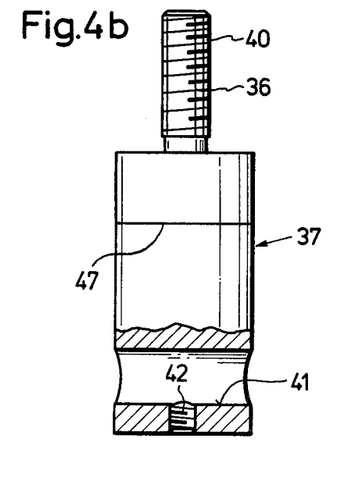
Figure 4C:
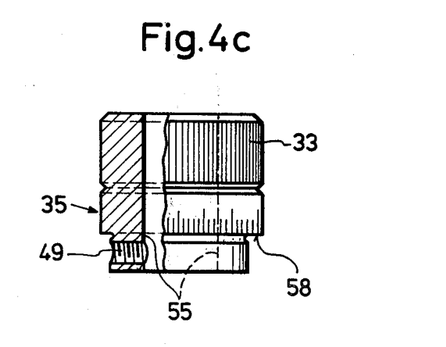
Figure 4D:
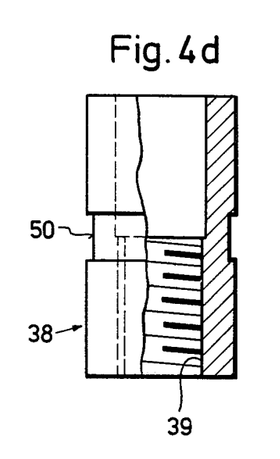
Figure 4E:
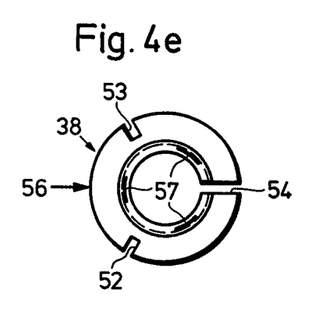
FIG. 4e is a top plan view of the device of FIG. 4d.

The connector 38, best seen in FIGS. 4d and 4e, has an annular, circumferential recess 50 in its outer, generally cylindrical face. The recess 50 receives the inner point of the screw 51. Three axial grooves 52, 53, 54 are equiangularly distributed in the cylindrical connector face. The grooves 52, 53 extend through approximately one half of the radial thickness of the connector and are closed in a radially inward direction. The groove 54 is a slot open toward the bore of the connector over the entire length of the same and interrupts threads 39 in the bore. The pressure of the set screw 51, when applied in the direction of the arrow 56, causes resilient flexing of the connector 38 in circumferential areas indicated in FIG. 4e by lines 57, and thus a tightening of the threads 39.

An annular split disc 44 of spring metal in the housing 32 spacedly subjacent the drum 35 (FIGS. 2 and 3) provides an abutment for one axial end of a helical compression spring 45 whose other end engages a radial top face of the generally cylindrical slide 37, shown individually in FIG. 4b. A spindle 36 is coaxially and fixedly fastened to the slide 37, and its external threads 40 matingly engage the internal threads 39 of the connector 38. A circumferential, engraved line 47 on the slide 37 is visible in the assembled instrument through an axially elongated slot 48 of the housing 32 alongside the scale 21. The afore-mentioned set screw 25 is received threadedly in an axial bore 42 of the slide 37 which communicates with a diametrical bore 41 dimensioned to receive the rod 26 with minimal clearance. The rod 26 passes radially outward of the housing 32 through an axially elongated slot 43 which permits axial movement of the rod together with the slide 37, but prevents angular displacement of the slide.

To measure a dimension of an object, the carrier pin 5 of the micrometer 4 is inserted between two blocks 3 after release of the springs 10 by the lever 11 at such a level that the contact member 23 or the scriber 31 is less than 10 mm above the point to be measured. The knob 33 is then turned until the dimension to be measured is approached to within one millimeter, a dimension that may be read approximately from the scale 21, the last two digits of the measurement being read from the scale 34 at the index line 60. Also, a desired dimension may be set by inserting the pin 5 in the proper interstice between two successive blocks 3, and the scales 21, 34 set to the last three digits of the dimension, and the gage 28 may be employed for determining the deviation of a workpiece from the set standard dimension. Other modes of operation of the apparatus described above with reference to FIGS. 1 to 5 will readily suggest themselves to those skilled in the art.

Gage blocks having four sides defining a square in the axial plane in which the pin 5 projects from the receptacle in the housing 2 are preferred. They do not require a very precise fit in the guide grooves 7 and may be turned 90° to present new faces to the pin 5 after long use and resulting wear. Cylindrical gage blocks, arranged with their axes parallel and horizontal, may be employed for cooperation with a suitably modified carrier pin on the micrometer 4, but require very precise alignment of their axes in a common vertical plane.

Whether the spindle 36 is attached to the slide 37 or to the drum assembly 33, 35, 38 will be chosen according to design considerations not directly relevant to this invention. It would be undesirable, however, to make the connector 38 integral with any other piece which would interfere with its tightening about the threads 40 of the spindle 36 by the screw 51, the screw simultaneously providing the fixed mounting of the connector 38 to the drum portion 35. The spring 45 further reduces unnecessary clearance between the matingly engaged threads 39, 40.

Figure 6:
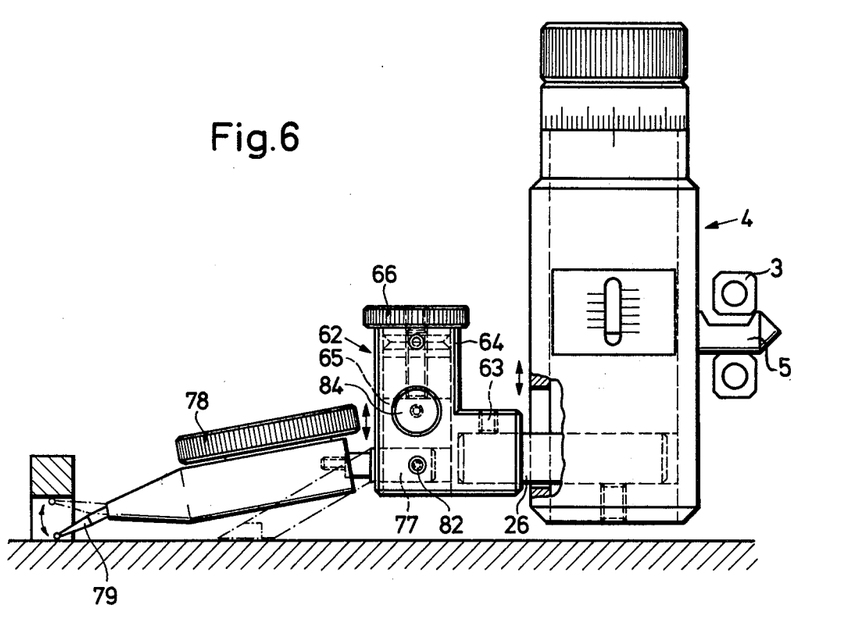
FIG. 6 shows a partial modification of the apparatus of FIG. 1 in fragmentary side elevation.
Figure 7A:
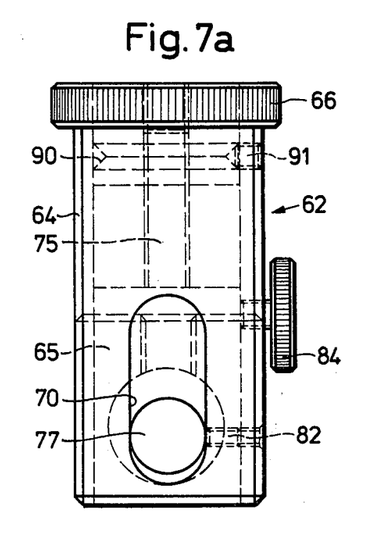
FIG. 7a illustrates a secondary micrometer in the apparatus of FIG. 6 in front elevation on a larger scale.
Figure 7B:
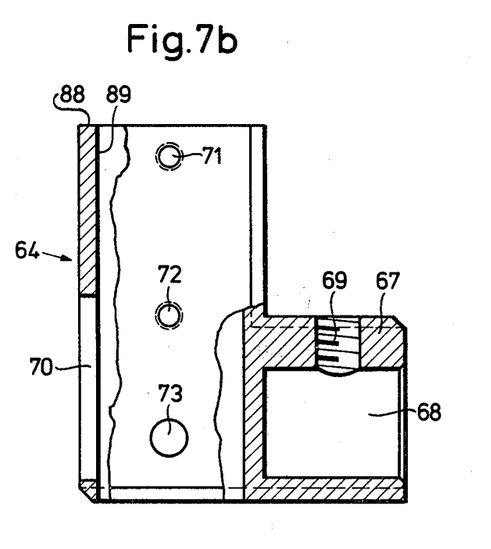
FIG. 7b shows the housing of the micrometer of FIG. 7a in side elevation and partly in section.
Figure 7C:
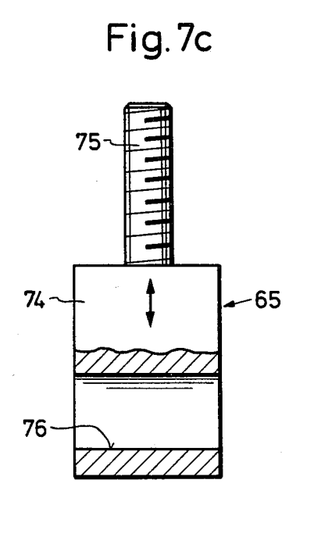
FIGS. 7c and 7e illustrate additional elements of the micrometer of FIG. 7a in views corresponding to FIG. 7b.
Figure 7D:
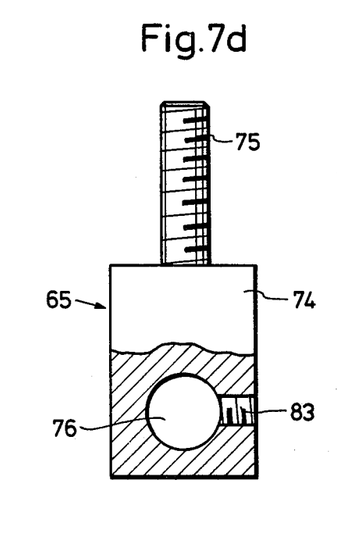
FIG. 7d illustrates the device of FIG. 7c in front elevation and partly in section.
Figure 7E:
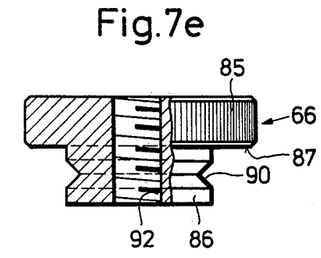
Figure 8:
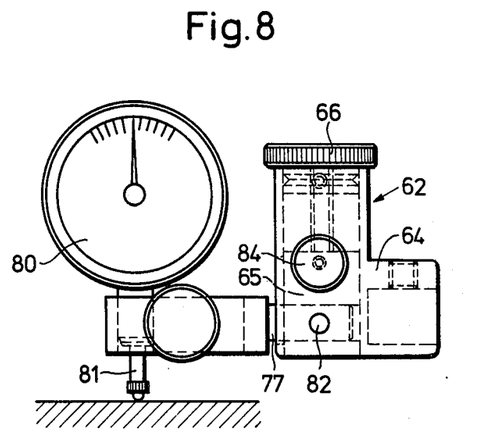
FIG. 8 is a fragmentary side elevation of the apparatus of FIG. 6 equipped with an alternative secondary micrometer.

Modifications of the apparatus shown in FIG. 1 are illustrated in FIGS. 6 to 8, and will be understood to include the base 1, housing 2, gage blocks 3, amd micrometer 4 where not specifically shown.

The measuring instrument illustrated in FIG. 6 includes an adjusting micrometer 62 which replaces the coupling 27 shown in FIG. 1. The micrometer 62 has three principal elements. Its housing 64 is attached to the rod 26 by a set screw 63, and a slide 65 may be moved in the direction of the normally vertical axis of the housing 64 by a knurled drum 66. The rod 26 is received in a conforming recess 68 of an integral radial extension 67 of the otherwise cylindrical housing 64, the set screw 63 being mounted in a threaded bore 69 of the extension 67, as is best seen in FIG. 7b.

The slide 65 has a cylindrical piston portion 74 and a coaxial spindle portion 75, as is seen in FIGS. 7c and 7d. A cylindrical pin 77 may be secured in a diametrical bore 76 of the piston portion 74 by a set screw 82 threadedly engaging a bore 83 in the piston portion 74. The set screw 82 is accessible through a radial bore 73 in the housing 64 (FIG. 7b) when the slide is in its lowest operating position. The pin 77 extends outward of the housing 64 through an axial slot 70 in the housing 64 and prevents rotation of the slide 65. The slide may be axially fixed by a clamping screw 84 having a large knurled head and received in a threshold radial bore 72 of the housing 64.

The spindle 75 is threadedly received in a threaded axial bore 92 of the drum 66. The enlarged knob portion 85 of the drum 66 outside the housing 64 has an annular, radial, bottom face 87 which slidably engages the annular face 88 of the housing 64 about the top orifice of its bore 89 (FIGS. 7e and 7b). The reduced portion 86 of the drum 66 which is matingly received in the bore 89 has a circumferential groove 90 of V-shaped cross section. The pointed end of a set screw 91 (FIG. 7a) received in a threaded radial bore 71 of the housing 64 projects into the groove 90 and axially secures the drum 66 without interfering with its rotation.

The pin 77 carries an indicating gage, conventional in itself, and including a dial 78 and an angularly movable contact point 79. As is shown in FIG. 8, the indicating gage 78, 79 shown in FIG. 6 may be replaced by a gage having a dial 80 and a longitudinally moving contact point 81, the gage being equipped with a pin 77 identical in cross section and length with the pin illustrated in FIG. 6.

The basic elements of this invention, as shown in FIG. 1, may thus be assembled with various accessories illustrated in FIGS. 1, 1a, 6, and 8 to permit precise measurement of many kinds. The accessory units explicitly shown obviously do not exhaust the combinations of partly conventional elements with the basic features of this invention.

It should be understood, therefore, that the foregoing disclosure relates only to presently preferred embodiments, and that it is intended to cover all changes and modifications of the examples of the invention herein chosen for the purpose of the disclosure which do not constitute departures from the spirit and scope of the invention set forth in the appended claims.

What is claimed is:
1. A measuring instrument comprising:
   a. a support defining an elongated receptacle;
   b. a plurality of gage members guided in said receptacle for longitudinal movement toward and away from a position in which said members abuttingly engage each other in the direction of elongation of said receptacle jointly to constitute a stack of gage members;
   c. a carrier member having one portion shaped to be received between each pair of longitudinally consecutive gage members in said stack;
   d. clamping means for clamping said gage members longitudinally against the received portion of said carrier member;
   e. securing means on said carrier member and on said gage members cammingly engageable for urging said one portion of said carrier member inward of said receptacle in response to said clamping by said clamping means and for thereby securing said one portion in said receptacle while another portion of said carrier member projects transversely from said receptacle; and
   f. gage means mounted on said projecting portion of the carrier member and including a contact member movable in said direction, and indicating means for indicating the position of said contact member relative to said carrier member.

2. An instrument as set forth in claim 1, wherein said carrier member is elongated in a plane parallel to said direction, the cross section of each gage member in said plane defining a square.

3. An instrument as set forth in claim 2, wherein said cross section has the shape of a square with beveled corners.

4. An instrument as set forth in claim 1, wherein said one portion of said carrier member has a free end part tapering conically in a direction away from said other portion of the carrier member.

5. An instrument as set forth in claim 4, wherein said gage members have beveled edges conformingly engaging said free end part in line contact while said carrier member is being inserted between a pair of said gage members perpendicularly to said direction of elongation.

6. An instrument as set forth in claim 1, further comprising first guide means on said support, said gage means further including a housing fixedly mounted on said projecting portion of the carrier member, and second guide means on said housing, said first and second guide means cooperating in response to the clamping of said gage members against the received carrier member for securing said housing in a fixed position relative to said support.

7. An instrument as set forth in claim 6, wherein said housing defines an axis parallel to said direction, said gage means further including a slide element axially movable in said housing and secured against rotation, and a drum element axially secured and rotatable on said housing about said axis, said elements being formed with respective, matingly engaged threads about said axis, one of said elements being resilient, and tightening means for resiliently deforming said one element transversely to said axis and for thereby tightening the threads of said one element against the threads of the other element, said contact member being secured to said slide element for joint axial movement.

8. An instrument as set forth in claim 7, wherein said one element has a tubular portion formed with an axial bore, the threads of said one element being internal threads of said tubular portion in said bore thereof, said tubular portion having an outer face formed with a plurality of circumferentially distributed grooves, one of said grooves radially extending to said bore, all other grooves being closed in a radially inward direction, said tightening means including a threaded member mounted on said one element for threaded movement in a radial direction and engageable with said tubular portion for radially compressing the same.

9. An instrument as set forth in claim 8, wherein said one element is said drum element, said drum element including a drum member accessible outside said housing for manual rotation, and a tubular member constituting said tubular portion, said threaded member being received in aligned, respective radial bores of said drum member and of said tubular member and securing the drum member and the tubular member against relative rotation about said axis.

10. An instrument as set forth in claim 6, wherein said housing defines an axis parallel to said direction, said gage means further including a slide element axially movable on said housing and secured against rotation, a drum element axially secured and rotatable on said housing about said axis, said elements being formed with respective, matingly engaged threads about said axis, and two sets of cooperating indicia, one of said sets including indicia on said housing and on said slide element and alignable by axial movement of said slide element, and the other set including indicia on said housing and on said drum element, the indicia of said other set being alignable by rotation of said drum element about said axis, said contact member being secured to said slide element for joint axial movement.

11. A measuring instrument comprising:
  a. a support defining an elongated receptacle;
  b. an abutment in said receptacle;
  c. a plurality of gage members guided in said receptacle for longitudinal movement toward and away from a position in which said members abuttingly engage each other in the direction of elongation of said receptacle jointly to constitute a stack of gage members,
    1. said stack including two longitudinally terminal gage members,
    2. one of said longitudinally terminal gage members engaging said abutment;
  d. a carrier member having one portion shaped to be received between each pair of longitudinally consecutive gage members in said stack;
  e. clamping means for clamping said gage members longitudinally against the received portion of said carrier member and for thereby securing said one portion in said receptacle while another portion of said carrier member projects transversely from said receptacle;
  f. a lever member pivotally mounted on said support and having one arm in said receptacle engaging the other longitudinally terminal gage member,
    1. said clamping means including yieldably resilient means pressing said one arm against said other longitudinally terminal gage member,
    2. said lever member having another arm accessible outside said receptacle for manual release of said stack from the pressure of said yieldably resilient means; and
  g. gage means mounted on said projecting portion of the carrier member and including a contact member movable in said direction, and indicating means for indicating the position of said contact member relative to said carrier member.

12. An instrument as set forth in claim 4, wherein said clamping means include yieldably resilient means for longitudinally comprising said stack in said receptacle.

13. An instrument as set forth in claim 5, wherein said yieldably resilient means include a plurality of cup springs superimposed on each other in said direction.

14. A measuring instrument comprising:
  a. a support defining an elongated receptacle and formed with a longitudinal slot leading transversely into said receptacle,
    1. said support having two guide faces flanking said slot;
  b. a plurality of gage members guided in said receptacle for longitudinal movement toward and away from a position in which said members abuttingly engage each other in the direction of elongation of said receptacle jointly to define a stack of gage members;
  c. a carrier member having one portion shaped to be received between each pair of longitudinally consecutive gage members in said stack;
  d. clamping means including yieldably resilient means for longitudinally compressing said stack and thereby clamping said gage members against the received portion of said carrier member while another portion of said guide member projects transversely from said receptacle through said slot; and
  e. gage means mounted on said projecting portion, said gage means including
    1. engagement means engaging said guide faces when said carrier member is clamped between the receiving gage members for securing said gage means to said support,
    2. a contact member movable in said direction,
    3. indicating means for indicating the position of said contact member relative to said carrier member,
    4. said carrier member and one of said receiving gage members having respective cammingly engaged faces,
    5. one of said faces being obliquely inclined relative to said direction for drawing said engagement means against said guide faces under the force of said yieldably resilient means.

15. An instrument as set forth in claim 14, wherein said carrier member and said one gage member have respective opposite faces perpendicular to said direction, said opposite faces defining an air gap therebetween when said engagement means engage said guide faces under the force of said yieldably resilient means.

* * * * *